United States Patent [19]
Ishii et al.

[11] Patent Number: 5,650,907
[45] Date of Patent: *Jul. 22, 1997

[54] CIRCUIT BREAKER

[75] Inventors: Kazuhiro Ishii; Kouji Hirotsune; Ichiro Arinobu; Kazushi Sato, all of Hiroshima, Japan

[73] Assignee: Mitsubishi Denki Kabushiki Kaisha, Tokyo, Japan

[*] Notice: The portion of the term of this patent subsequent to Jul. 14, 2008, has been disclaimed.

[21] Appl. No.: 669,463

[22] Filed: Mar. 14, 1991

[30] Foreign Application Priority Data

Mar. 15, 1990 [JP] Japan .................. 2-62700

[51] Int. Cl.⁶ .................. H02H 3/08; G08B 21/00
[52] U.S. Cl. .................. 361/93; 340/661; 324/509
[58] Field of Search .................. 361/44, 45, 46, 361/49, 93–97; 340/661, 664, 638; 324/509, 510, 522, 523, 527

[56] References Cited

U.S. PATENT DOCUMENTS

| | | | |
|---|---|---|---|
| 3,924,160 | 12/1975 | Maier et al. | 317/36 |
| 4,414,601 | 11/1983 | Conroy | 361/97 |
| 4,558,310 | 12/1985 | McAllise | 340/661 |
| 4,714,975 | 12/1987 | Dvorak | 361/44 |
| 4,761,704 | 8/1988 | Fraisse | 324/509 |
| 4,874,603 | 10/1989 | Ishii | 361/96 |

FOREIGN PATENT DOCUMENTS

| | | |
|---|---|---|
| 0 333 412 | 9/1989 | European Pat. Off. . |
| 2 097 613 | 11/1982 | United Kingdom . |
| 2 204 198 | 11/1988 | United Kingdom . |
| 0 330 148 | 8/1989 | United Kingdom . |

*Primary Examiner*—Peter S. Wong
*Assistant Examiner*—Adolf Berhane
*Attorney, Agent, or Firm*—Burns, Doane, Swecker & Mathis, LLP

[57] ABSTRACT

An electronic circuit breaker is provided with a plurality of air coils, each of which is coupled to a main circuit and an overcurrent signal integrating circuit which receives the output of the air coil to output an overcurrent signal when the current through the main circuit exceeds a predetermined value. A current signal simulating an overcurrent in the main circuit is fed from an external testing device into a current signal receiving terminal (CST). A test voltage generating resistor (TVGR) is connected between the CST and ground. The current signal flows through the TVGR to develop a test voltage across the TVGR. Thus, the overcurrent signal integrating circuit simulates the overcurrent signal on the basis of the test voltage.

4 Claims, 5 Drawing Sheets

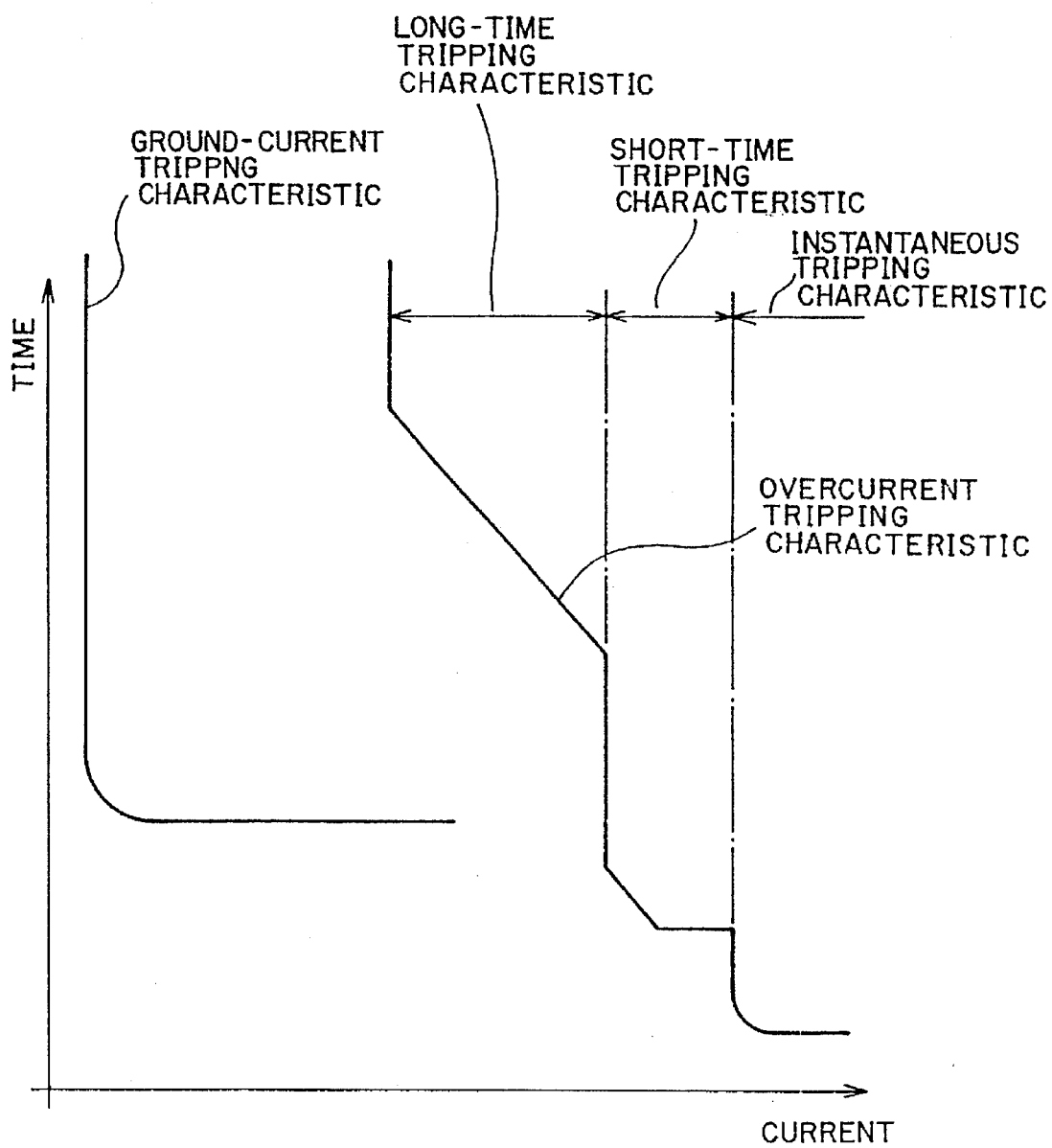

5,650,907

CIRCUIT BREAKER

BACKGROUND OF THE INVENTION

1. Field of the Invention

The present invention relates to an electronic circuit breaker, and relates particularly to a circuit breaker in which a current signal may be used to simulate an overload current when testing the circuit breaker to insure that the solid state trip circuit is functioning correctly.

2. Prior Art

FIG. 2 is a block diagram showing a general configuration of a conventional circuit breaker 5 whose tripping characteristics are shown in FIG. 3. The operation-inhibiting circuit 25 opens the contacts 30 to inhibit a tripping operation if the power supply voltages are too low for the respective circuits in the circuit breaker to operate normally. Normally, the output contacts 30 are closed by the operation-inhibiting circuit 25. When any one of the tripping circuits 18–21 outputs a trip signal, the trip signal is supplied through the contact 30 to the electronic switch 8, which is closed by the trip signal, to energize the trip coil 3. The energized trip coil 3 then drives the tripping mechanism to open the contacts 2 of the main circuit. The trip signal is also supplied to the ALM circuit 9 which outputs an alarm signal. The trip signals from respective tripping circuits 18–21 are directed to the short-time/instantaneous tripping display circuit 24, the long-time tripping display circuit 23, and the ground overcurrent tripping display circuit, respectively.

While a circuit breaker using a current transformer as a current sensor suffers from the saturation of a magnetic core at higher currents, a circuit breaker using an air coil as a current sensor has the advantage that the output of the sensor is not saturated. In the conventional air coil type circuit breaker, a voltage is developed across the air coil. Thus, it is necessary to feed a voltage test signal from an external testing device when testing the function of the circuit breaker in the field. However, it is a current-injecting type testing device that a workman usually uses in the field.

SUMMARY OF THE INVENTION

The present invention is made in view of the above-described drawbacks. An object of the present invention is to provide a circuit breaker using an air coil type current sensor in which the functions of a circuit breaker can be tested in the field by using a current signal that simulates an overload current in the main circuit.

An electronic circuit breaker according to the present invention is provided with a plurality of air coils, each of which is coupled to a main circuit and an overcurrent signal integrating circuit which receives the output of the air coil to output an overcurrent signal when the current through the main circuit exceeds a predetermined value. The overcurrent signal integrating circuit has a current signal receiving terminal (CST) into which a current signal simulating an overcurrent in the main circuit is fed from an external testing device, and a test voltage generating resistor (TVGR) which is connected between the CST and ground and through which the current signal flows to develop a test voltage. Thus, the overcurrent signal integrating circuit simulates the overcurrent signal on the basis of the test voltage.

BRIEF DESCRIPTION OF THE DRAWINGS

Features and other objects of the invention will be more apparent from the description of the preferred embodiments with reference to the accompanying drawings in which:

FIG. 3 shows tripping characteristics of the circuit breaker shown in FIG. 2.

DETAILED DESCRIPTION OF THE PREFERRED EMBODIMENTS

First embodiment

Figure 1:
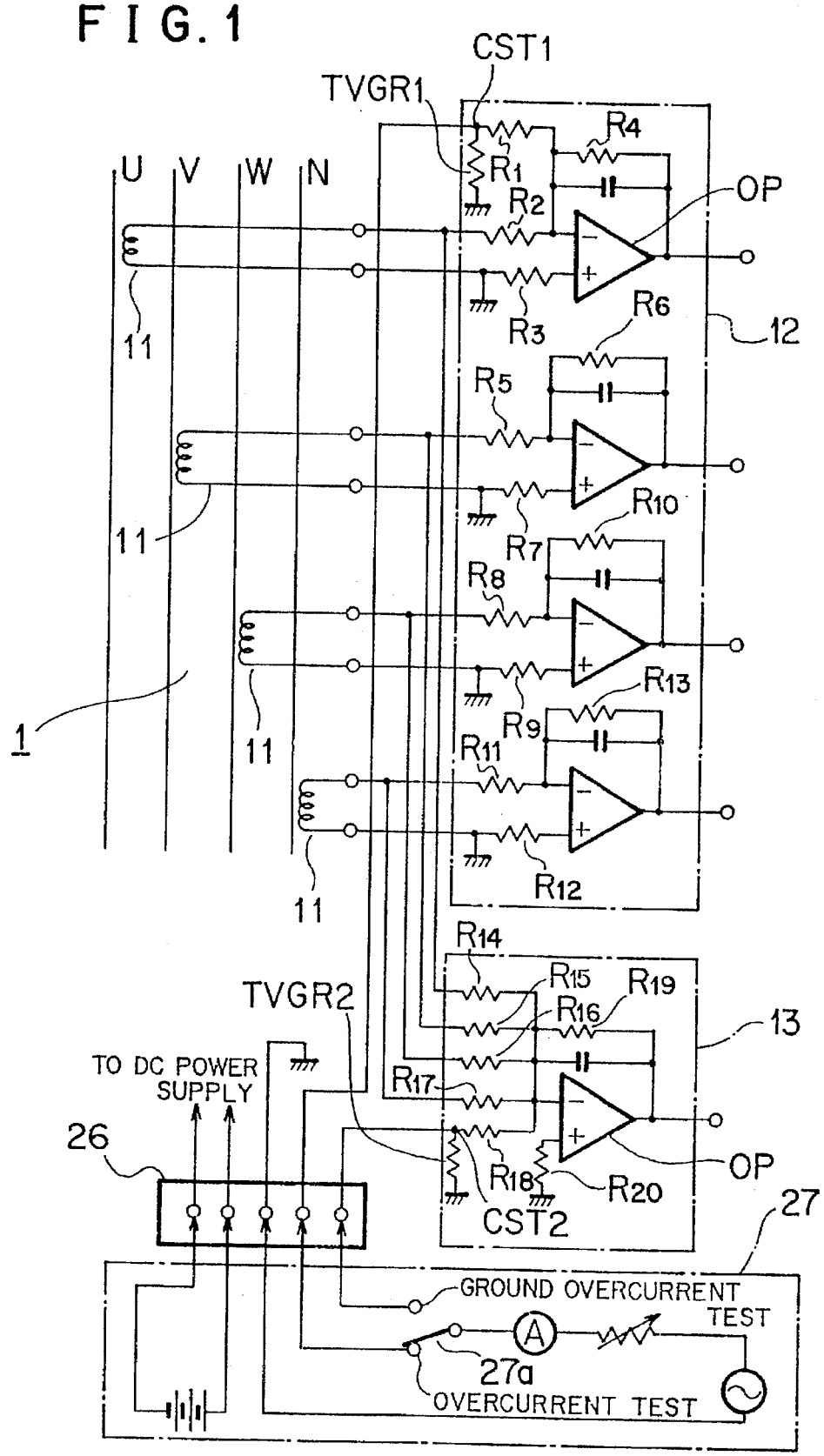
FIG. 1 is a schematic diagram showing a first embodiment of the present invention.

FIG. 1 shows a schematic diagram of a first embodiment of the invention. Air coils 11 are coupled to the conductors of respective phases U, V, W, and N of a main circuit. When an overcurrent flows through any one of the conductors, a voltage is induced across the associated air coil by the overcurrent. The induced voltage has an amplitude proportional to the magnitude of the overcurrent and a waveform of the overcurrent differentiated with respect to time. An overcurrent signal integrating circuit 12 receives the voltage and then outputs an overcurrent signal to a full wave rectifying circuit 14. The overcurrent signal integrating circuit 12 includes integrators, each of which is constructed of an operational amplifier, resistors and a capacitor. The respective integrator is connected to the air coil 11 and integrates the voltage thereacross so as to produce an overcurrent signal proportional to and in phase with the overcurrent. The integrator of the phase U includes a test voltage generating resistor 1 (referred to as TVGR1 hereinafter), one end of which is connected with a current signal receiving terminal 1 (referred to as CST1 hereinafter) and the other end of which to ground. The CST1 is connected to a test terminal board 26 and to a negative input terminal of the operational amplifier via a resistor R1. The resistance of TVGR1 is selected to be on the order of, for example, several ohms and less than about 1/100 of the resistor R1 so that a test signal in the form of a current signal can be injected into the TVGR1 from an external testing device via the CST1. Additionally, the potential of the negative input terminal is virtual ground. Thus, the presence of the TVGR1 in the circuits within the circuit breaker will not adversely affect the overcurrent-detecting operation of the circuit breaker and yet allows a workman to perform a function test of the circuit breaker in the field using a conventional current signal type testing device.

Figure 4:
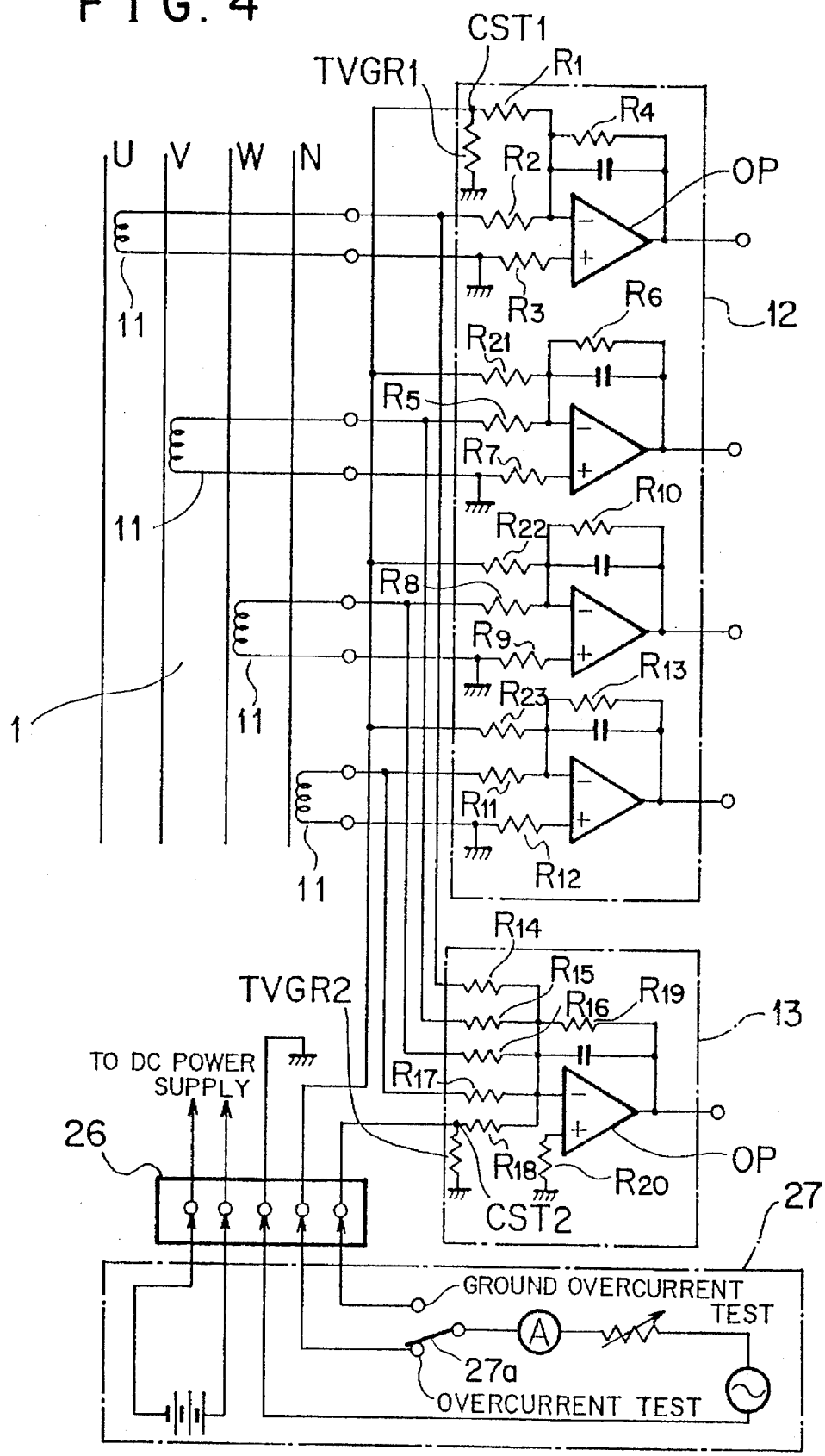
FIG. 4 is a schematic diagram showing a second embodiment of the invention.

A ground fault current circuit 13 has an integrator constructed of an operational amplifier OP, resistors, and a capacitor, and is connected to the respective air coils 11 so as to produce a ground overcurrent signal proportional to the ground overcurrent in the main circuit. In FIGS. 1 and 4, it should be noted that the negative input terminal of the operational amplifier OP of the ground fault current circuit 13 is connected via resistors R14–17 to the respective air coils. This circuit 13 is so constructed that a vectorial sum of the outputs of air coils is produced by the circuit since these outputs are not in phase with each other. If the current in the main circuit is normal, then the vectorial sum is zero. If an ground overcurrent exists, the vectorial sum is not zero; a ground overcurrent signal appears at the output of the operational amplifier OP. A current signal receiving terminal 2 (referred to as CST2 hereinafter) is connected to the test terminal board 26 and to the negative input terminal of the operational amplifier via a resistor R18. The CST2 is connected to the TVGR2, the other end of which is grounded.

The resistance of TVGR2 is selected to be on the order of, for example, several ohms and less than about 1/100 of the resistor R18 so that a test signal in the form of a current signal can be injected from an external testing device via the CST2. Additionally, the potential of the negative input terminal is virtual ground. Thus, the presence of the TVGR2 in the circuits within the circuit breaker will not adversely affect the ground overcurrent detecting operation and yet allows a workman to perform a function test of the circuit breaker in the field by using a conventional current signal type testing device.

Figure 2A:
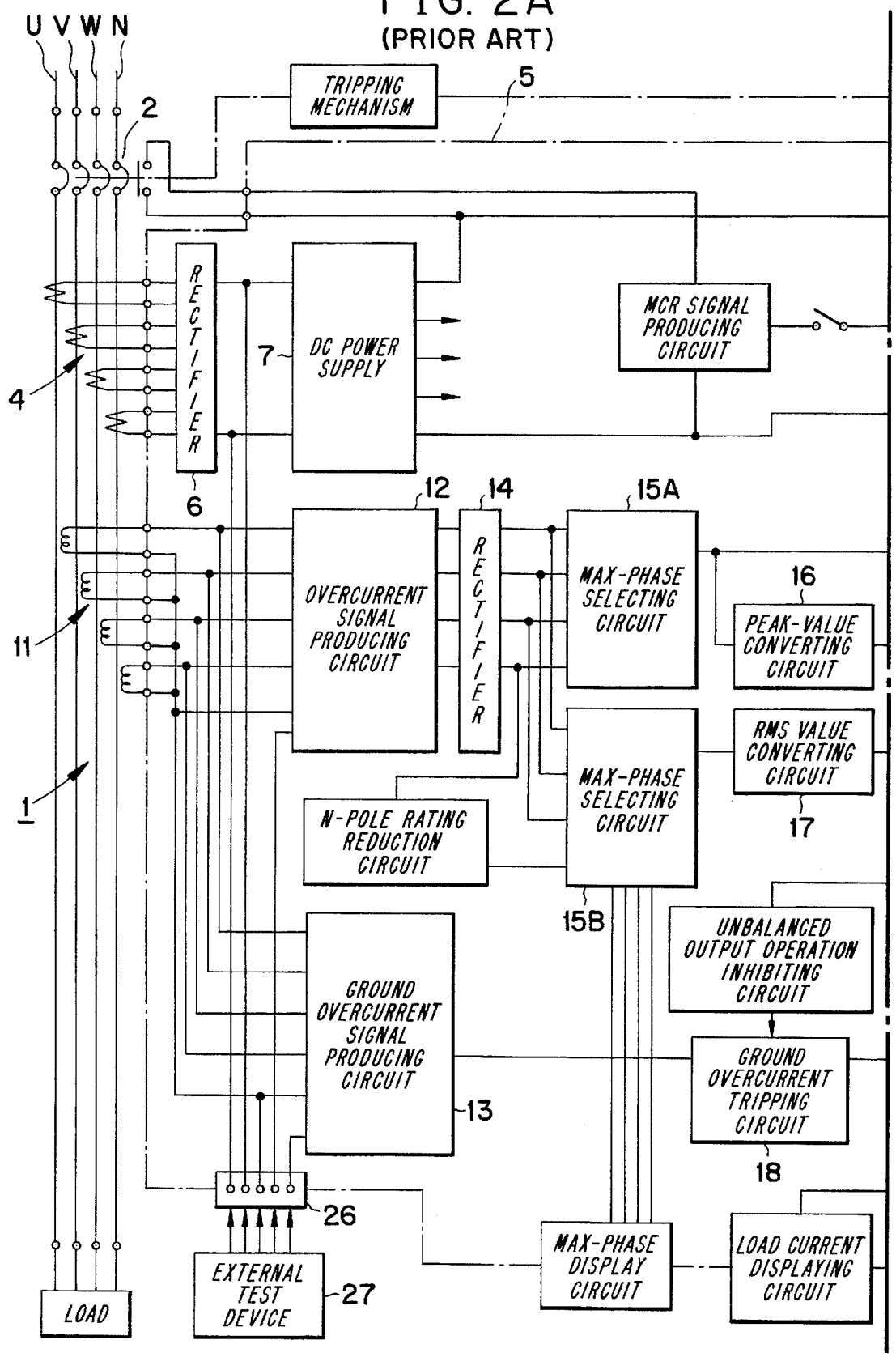
FIG. 2 is a block diagram showing a general construction of a circuit breaker according to the present invention as well as a prior art circuit breaker.
Figure 2B:
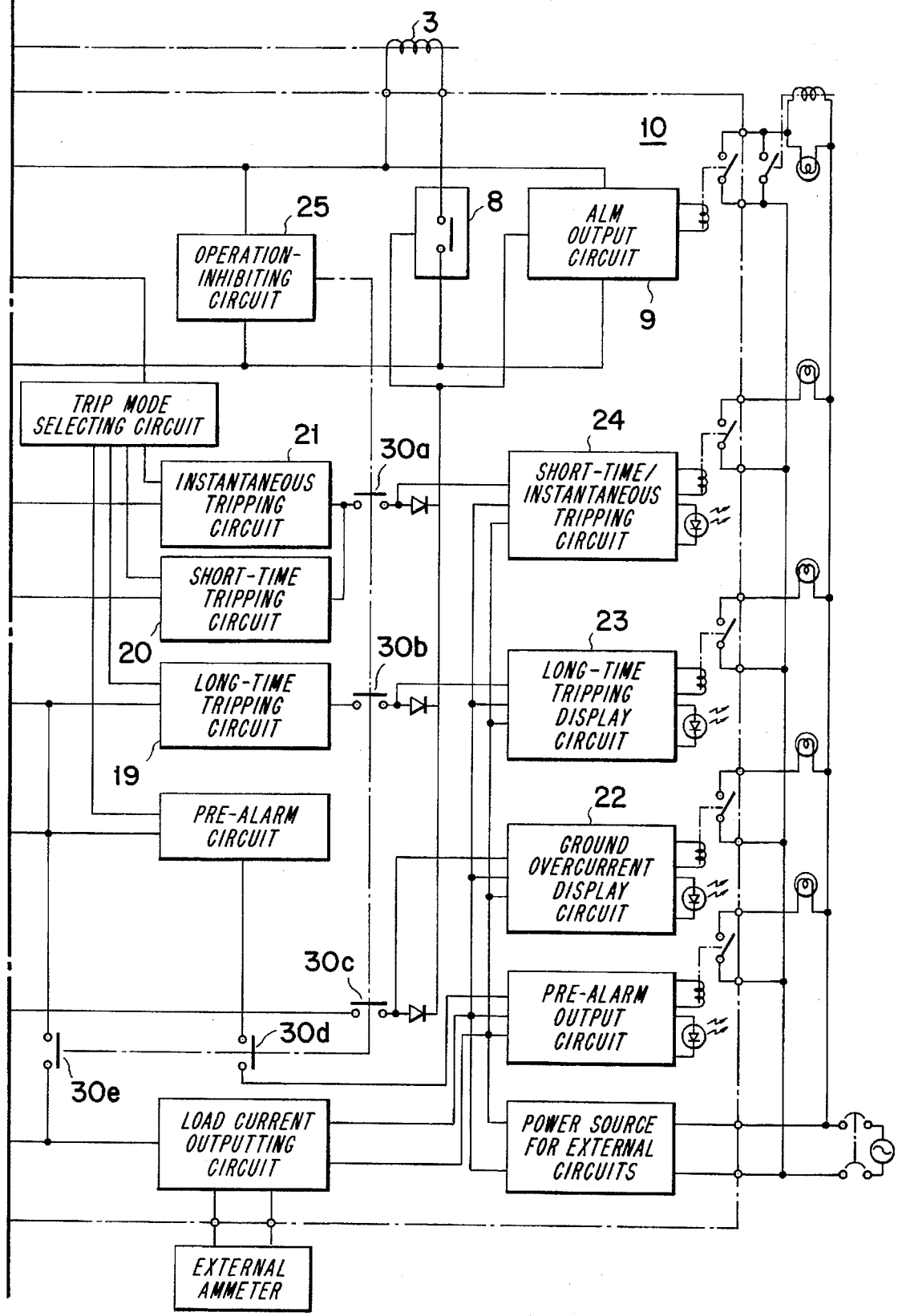

FIG. 2 shows a general construction of a circuit breaker according to the present invention. A voltage is developed across the air coil 11 which has an amplitude proportional to the current in the main circuit and a waveform of the overcurrent differentiated with respect to time. The overcurrent signal integrating circuit 12 receives and integrates the voltage across the air coil so as to output to the rectifying circuit 14 an overcurrent signal in phase with the current in the main circuit. The overcurrent signal in phase with the current through the main circuit plays an important role in a later described instantaneous tripping operation. The output of the rectifying circuit 14 is not smoothed out at all and therefore carries instantaneous amplitude information of the current in the main circuit. The output of the rectifying circuit 14 is supplied to a maximum-phase selecting circuit 15A which selects a phase having an overcurrent signal of the highest magnitude from U, V, W, and N. A peak value converting circuit 16 converts the output of the maximum-phase selecting circuit 15A into a peak value signal to feed it to a short time tripping circuit 20. When the peak value signal exceeds the short-time tripping characteristic in FIG. 3, the short-time tripping circuit 20 outputs a trip signal to the electronic switch 8. The electronic switch 8 is closed by the signal to energize the trip coil 3 which in turn drives the tripping mechanism to open the contacts 2.

The output of the maximum-phase selecting circuit 15A is also connected with an instantaneous tripping circuit 21. When the output of the circuit 15A exceeds the instantaneous tripping characteristic in FIG. 3, the instantaneous tripping circuit 21 outputs a trip signal to the electronic switch 8. The electronic switch 8 is closed by the signal to energize the trip coil 3 which in turn drives the tripping mechanism to open the contacts 2.

The output of rectifying circuit 14 is also supplied to a maximum-phase selecting circuit 15B which selects a phase having an overcurrent signal of the highest magnitude from U, V, W, and N. An rms value converting circuit 17 converts the output of the circuit 15B into an rms value signal to feed it to the long time tripping circuit 19. When the rms value signal exceeds the long-time tripping characteristic in FIG. 3, the long-time tripping circuit 19 outputs a trip signal to the electronic switch 8. The electronic switch 8 is closed by the signal to energize the trip coil 3 which in turn drives the tripping mechanism to open the contacts 2.

As shown in FIG. 2, when the ground overcurrent signal exceeds the ground overcurrent tripping characteristic in FIG. 3, the ground overcurrent tripping circuit 18 outputs a trip signal to the switch 8. The electronic switch 8 is closed by the signal to energize the trip coil 3 which in turn drives the tripping mechanism to open the contacts 2.

Second embodiment

FIG. 4 shows a second embodiment of the invention. The test voltage developed across the TVGR1 is supplied to all integrators via respective resistors R1, R21, R22, and R23. Since the integrators are supplied the same test voltage, they are supposed to output overcurrent signals of the same magnitude. However, these overcurrent signals may be slightly different in magnitude because of variations in the circuit components. Thus, the maximum-phase selecting circuit 15A selects an overcurrent signal of the largest magnitude. This means that when a circuit breaker of the invention is tested, the same phase is always selected. Although all the phases are not tested explicitly, this construction is still good enough to effect simple, quick test of the circuit breaker in the field test.

Operation

As shown in FIG. 1, an external testing device 27 is connected to the test terminal board 26 of circuit breaker 5. When the switch 27a is thrown into the position of OVERCURRENT TEST, a test current flows through the test terminal board 26, via the CST1, into TVGR1 and then to ground, developing a test voltage across the TVGR1. The integrator produces an overcurrent signal on the basis of the test voltage. By varying the magnitude of the test current, it is possible to simulate the instantaneous tripping operation, short-time tripping operation, and long-time tripping operation of the circuit breaker according to the present invention. The maximum-phase selecting circuit 15A selects a phase having the largest magnitude from the phases U, V, W, and N. The peak-value converting circuit 16 converts the output of the circuit 15A into a peak value signal and supplies it to the short-time tripping circuit 20. In the first embodiment, the phase U has the TVGR1, and therefore the phase U is selected as a maximum phase. In this manner, a simple and quick function test can be effected with the circuit breaker connected to the main circuit.

When the switch 27a is thrown into the position of GROUND OVERCURRENT TEST, a test current flows through the test terminal board 26, via the CST2, into TVGR2 and then to ground, developing a test voltage across the TVGR2. The integrator produces a ground overcurrent signal on the basis of the test voltage. In this manner, a simple and quick function test can be effected with the circuit breaker connected to the main circuit.

Industrial Applicability

A circuit breaker using air coils as a current sensor can be tested in the field by a current signal supplied from an external testing device as in the circuit breakers using a current transformer.

What is claimed is:

1. A circuit breaker comprising:
a plurality of air coils, each of which is coupled to each conductor in a main circuit for outputting a voltage signal proportional to a current flowing in the conductor; and
an overcurrent-signal integrating circuit for receiving the voltage signals from said air coils to output an overcurrent signal when an overcurrent exceeding a predetermined value flows in the main circuit, said overcurrent signal integrating circuit including a current-signal receiving terminal into which a current-signal simulating said overcurrent is supplied from an external test device, a test voltage generating resistor connected between said current-signal receiving terminal and ground, and a plurality of integrating circuits, each of which integrates the output of each of said air coils; wherein a test voltage is developed across said resistor when said current-signal is supplied to said terminal and said overcurrent-signal integrating circuit simulates said overcurrent signal on the basis of said test voltage.

2. A circuit breaker comprising:
a plurality of air coils, each of which is coupled to each conductor in a main circuit for outputting a voltage signal proportional to a current flowing in the conductor;

an overcurrent-signal integrating circuit for receiving the voltage signals from said air coils to output an overcurrent-signal when an overcurrent exceeding a first predetermined value flows in the main circuit, said overcurrent-signal integrating circuit including a first current-signal receiving terminal into which a first current-signal simulating the overcurrent in the main circuit is supplied from an external test device, a first resistor connected between said first current-signal receiving terminal and ground such that a first test voltage is developed across said first resistor when said first current-signal is supplied to said terminal, and a plurality of integrating circuits, each of which integrates the output of each of said air coils; and a ground fault current circuit for receiving the voltage signals from said plurality of air coils to output a ground fault current circuit signal when a ground overcurrent exceeds a second predetermined value, said ground fault current circuit including a second current-signal receiving terminal into which a second current-signal simulating the ground overcurrent in the main circuit is supplied from an external test device and a second resistor connected between said second current signal receiving terminal and ground such that a second test voltage is developed across said second resistor when said second current-signal is supplied to said second current signal receiving terminal.

3. A circuit breaker according to any one of claim 1, wherein said overcurrent signal integrating circuit includes a plurality of amplifiers, each of which is coupled to each of said air coils for receiving said voltage signals therefrom to output an overcurrent signal, said amplifiers receiving said test voltage to simulate said overcurrent signal on the basis of said test voltage.

4. A circuit breaker according to any one of claim 2, wherein said overcurrent signal integrating circuit includes a plurality of amplifiers, each of which is coupled to each of said air coils for receiving said voltage signals therefrom to output an overcurrent signal, said amplifiers receiving said first test voltage to simulate said overcurrent signal on the basis of said first test voltage.

* * * * *

UNITED STATES PATENT AND TRADEMARK OFFICE
CERTIFICATE OF CORRECTION

PATENT NO. : 5,650,907
DATED      : July 22, 1997
INVENTOR(S) : Kazuhiro ISHII; Kouji HIROTSUNE; Ichiro ARINOBU; and Kazushi SATO It is certified that error appears in the above-indentified patent and that said Letters Patent is hereby corrected as shown below:

On the front page of the Letters Patent, at item *, please change to read as follows:

--Notice: The portion of the term of this patent subsequent to November 22, 2011, has been disclaimed.--

Signed and Sealed this

Sixteenth Day of December, 1997

*Attest:*

BRUCE LEHMAN

*Attesting Officer*   Commissioner of Patents and Trademarks